Figure 1:
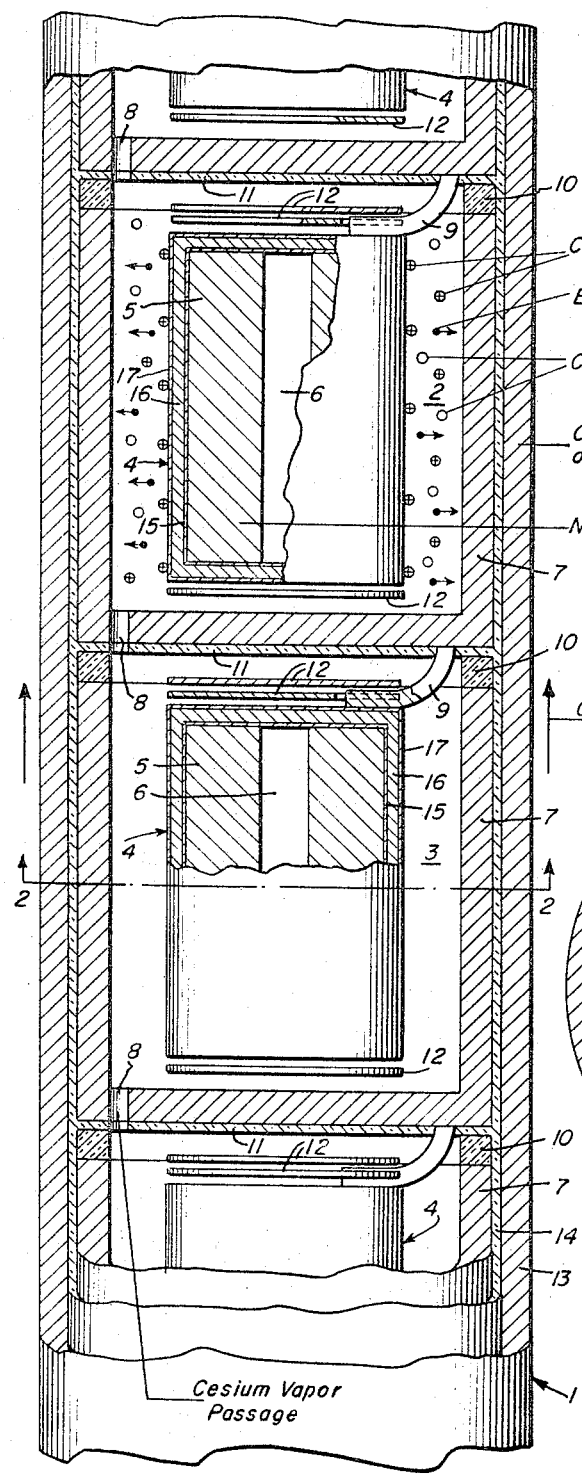

July 11, 1967 V. C. WILSON 3,330,974
POWER GENERATION APPARATUS
Filed Feb. 3, 1964

Inventor:
Volney C. Wilson,
by John P. Dellitt
His Attorney.

United States Patent Office 3,330,974
Patented July 11, 1967

3,330,974
POWER GENERATION APPARATUS
Volney C. Wilson, Scotia, N.Y., assignor to General
Electric Company, a corporation of New York
Filed Feb. 3, 1964, Ser. No. 341,858
11 Claims. (Cl. 310—4)

This invention relates to electrical power generation apparatus for use in a nuclear reactor and particularly to said apparatus wherein reactor heat causes the flow of an electrical current in the form of thermionic emission.

A thermionic converter is a two-electrode electrical power generation device wherein a heat differential between spaced electrodes causes the electron emission from a hotter electrode to a cooler electrode, thus establishing current flow therebetween. Thermionic converters desirably operate at high input temperatures above 1400° K. and heat rejection temperatures from 700° to 1000° K. Because of the high temperatures involved, a nuclear reaction is an appropriate source of heat for the converter.

In one particularly desirable arrangement, a nuclear reactor comprises a plurality of cylindrical, fissionable-material-containing fuel rods inserted in moderator material inside a reflective containment structure and provided with a source of neutrons for initiating fission reaction. The fuel rods themselves include fissionable material in contact with the emitter of the thermionic converter for heating the same to a high operating temperature. The heated emitter may itself form a cylindrical fuel container.

Among the most promising types of thermionic converters are those including alkali metal vapor between the collector and the heated, electron-emitting, emitter member. This alkali metal vapor, and especially cesium vapor, has the desirable property of forming an ionized plasma for neutralizing undesirable space charge between the converter electrodes and also has the property of lowering the work function of the electrode surfaces, or that energy value to which electrons must be excited for emission at the emitter electrode and through which electrons drop when arriving at the collector electrode. Thermionic converters, particularly of this type, have been found to generate the most power most efficiently at emitter temperatures for example above 2000° K. Such operating temperatures, however, pose a materials problem in constructing operable thermionic converters. Emitter member materials which will withstand contact with the fissionable fuel frequently have too low a melting temperature or else the structural thickness necessary for encasing the fissionable fuel, and providing sufficient electrical conductivity to the emitter, has too large a neutron capture cross-section for a proper operation of a nuclear reactor; that is, too heavy a thickness of refractory electrode metals frequently has the undesirable effect of materially slowing down or poisoning the chain reaction necessary in reactor operation. Of course, extra fissile fuel could be added to overcome the extra neutron absorption, but such an expedient often renders the reactor uneconomical. On the other hand, materials known to have a low neutron capture cross-section either make poor emitter electrodes or else react chemically with uranium fuels.

It is therefore an object of the present invention to provide an electrical power generation apparatus in the form of a thermionic converter used in a nuclear reactor for operating at temperatures above 2000° K. in order to obtain efficient operation and optimized electrical power generation. It is another object of the present invention to provide such apparatus having an emitter structure capable of containing fissionable fuel and acting as an emitter source of electrons with a minimum of deleterious effect due to high neutron capture.

Figure 3:
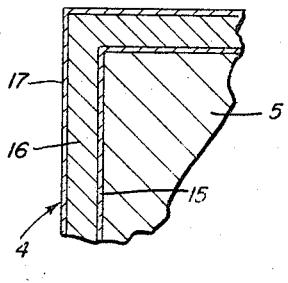
Figure 2:
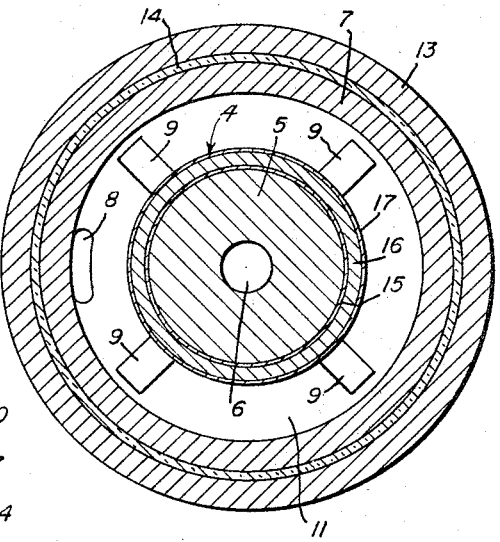

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a vertical cross-section of a portion of a fuel rod, in accordance with the present invention, having serially disposed thermionic converters arranged longitudinally thereof, FIG. 2 is a horizontal cross-section of the FIG. 1 fuel rod, and FIG. 3 is an enlarged cross-section of a portion of an emitter member from the fuel rods of FIGS. 1 and 2.

Referring to the drawings, a fuel rod 1, for insertion in a nuclear reactor, includes a plurality of serially connected thermionic converters 2 and 3 extending longitudinally of the fuel rod. Each converter includes an emitter member 4, conveniently cylindrical in shape, enclosing a body of fissionable fuel 5, preferably uranium dioxide. The fissionable fuel 5 is in contact with the cylindrically curved inside surface of the emitter member and substantially fills the interior of the enclosed emitter member except for a central initially evacuated portion 6 reserved for subsequently generated fission products, gases and the like.

Coaxially spaced from the emitter member is a cylindrical metal collector 7 having the function of receiving electrons emitted by the nuclear fuel. The interior of each thermionic converter, between emitter and collector, communicates with the next through an aperture 8 for allowing passage of alkali vapor and particularly cesium vapor through the cells of the fuel rod. At an appropriate point in the fuel rod an alkali metal reservoir (not shown) communicates with one of the converters which in turn communicates to the other converters in sequence. The purpose of supplying alkali metal vapor to the interior of the converters is the reduction in space charge between the converter emitter and collector as well as a reduction of work function of the emitter and collector surfaces.

A connection 9 electrically couples the emitter member of each converter to the collector of the converter immediately thereabove, thereby providing a series circuit of converters in the rod. It is understood that end connections in a complete fuel rod are used to connect the series arrangement of converters in one rod to other rods and to outside circuitry.

Although the converters are connected electrically and provided with a gaseous passage therebetween, they are otherwise desirably insulated thermally and electrically except for the aforementioned series connection. Therefore, an annular insulating spacer 10 separates successive converters at their periphery, this spacer desirably being formed of alumina or yttria. An insulating layer 11 also separates the central portion of each converter from the next and this layer is also suitably alumina or yttria. Heat shields 12 located at either end of the cylindrical emitter member are spaced to prevent excessive transmission of heat from an emitter member toward the next adjacent converters.

This fuel containing converter structure is enclosed in a fuel rod outer jacket 13 separated from the thermionic converter structure employing an insulating layer 14 therebetween. Outer jacket 13 is conveniently niobium while layer 14 may again be alumina or yttria. In an operating atomic reactor, employing one or more such fuel rods, coolant is desirably circulated along the fuel rods for the purpose of cooling the fuel rods including collectors 7 preferably to a temperature below 1000° K., as well as for conveying useful heat away from the reactor. The coolant can then be used in the generation of power, as for example in the operation of steam turbines and the like.

The converter structure as thus illustrated in the drawings is not intended to be to scale and is therefore not intended to be accurately indicative of the distances and spacing involved. In the actual converter, the spacing between emitter member and collector is on the order of a few mils. The internal structural support and the like appropriate for close-spaced construction, e.g. internal support for emitter member 4 and heat shields 12, is conveniently illustrated in copending application Ser. No. 69,414, of Jackson Lawrence, entitled "Series Connection and Spacing Techniques for Thermionic Converters," assigned to the assignee of the present invention.

It is understood a fuel rod as herein described forms at least one of several removable fuel rods in a nuclear reactor for operating to provide electrical power. Such nuclear reactor may further comprise a neutron-reflective container including moderator material surrounding insertable fuel rods and provided with a source of neutrons for initiating fission reaction. The source of neutrons in some instances may comprise the fuel itself and of course this is particularly the case after a fission reaction is once started in a critical mass of fissionable material. In any case, friction reaction is initiated for the purpose of heating emitter members to a temperature preferably above 2000° K. 2300° K. is an exemplary emitter operating temperature. The thermal agitation of the electrons on the surface of the emitter member lifts some of the electrons from the Fermi potential of the emitter over the work function barrier, $\phi_E$, at the surface of the emitter, wherein the Fermi level is defined as that energy level which has a probability of one-half of being occupied by an electron. The electrons escaping the emitter have kinetic energy and also have increased negative potential energy relative to the electrons in the emitter. It is desirable to collect the electrons with as little loss of potential or as little plasma loss as possible. As the electrons enter the collector electrode, they fall through the collector surface work function barrier, $\phi_C$, and finally arrive at the Fermi potential of the collector metal. The difference between the emitter and collector Fermi potentials in this configuration is the output voltage which may be applied to cause a current flow in an outside circuit (not shown) connected between the series connected emitters and collectors. The difference in Fermi potentials is also called the contact potential between emitter and collector. This voltage may have a small value but the D.C. current flow may be comparably quite large as compared with conventional power supply apparatus. A current density of 25 amps per square centimeter of electrode area is feasible in accordance with the present invention at high temperatures, at conversion efficiencies of 20% or better.

At higher emitter operating temperatures, e.g. in the range of 2000 to 2400° K., many otherwise appropriate materials for the emitter are no longer useable. A bare uranium-compound fuel pellet as an emitter electrode surface is usually found to exhibit insufficient strength and cracks or crumbles under the influence of the generation of fission products. A refractory electrode emitter such as tungsten, on the other hand, is found to be both a desirable electron emitter and a suitable container for uranium compound nuclear fuel. Tungsten has an unusually high melting temperature and is appropriate for jacketing the uranium fuel to give the fuel pellet strength and longer life. Moreover tungsten and uranium dioxide nuclear fuel are compatible at these temperatures, that is they do not react chemically with one another. The vapor pressure of tungsten is also much lower than uncovered dioxide fuel, and less than many other metals, while tungsten has the additional desirable property of absorbing cesium in a cesium vapor converter much better than would uncovered uranium dioxide. Furthermore, tungsten is strong and maintains its shape as an emitter so as to retain a spacing of a few mils between emitter member and collector. However, the necessary thickness of tungsten required for sufficient electrical and heat conductivity presents much too large a cross-section to neutrons during the fission reaction. An appreciable thickness of tungsten for emitter member 4 would tend to poison and slow down the fission reaction unless an uneconomically excessive amount of fuel were to be employed. On the other hand, a very thin, e.g. 10 mil thick jacket of tungsten, marginally strong enough to maintain its shape, but of low neutron capture cross-section, would unfortunately have insufficient electrical conductivity for satisfactory thermionic converter operation.

In accordance with the present invention, emitter member 4, rather than being formed of a single refractory metal, is instead formed of a plurality of metal layers including non-reactive and emitting surfaces respectively, and a layer therebetween of conductive refractory metal having a low neutron absorption cross-section. In this manner sufficient emitter member thickness is provided for purposes of mechanical strength, and for sufficient electrical and heat conductivity.

Tungsten is the preferred metal for the inner layer 15 because of its high melting temperature, strength and compatibility with nuclear fuel. Niobium is preferred for the intermediate layer 16 since it is also a refractory metal having a very high melting temperature but is one having a much lower neutron absorption cross-section than tungsten. Tungsten is also a desirable material for the outside layer 17 of the emitter member facing collector 7 of the thermionic converter. As an outside or emitting layer, tungsten has the additional advantages of low vapor pressure and ability to adsorb cesium as a layer of emitting material, or one which lowers the work function of the tungsten surface. In the above manner, a compound emitter member structure is thus provided having all the advantages of tungsten without the disadvantages thereof.

It is desired the tungsten layers 15 and 16 have thicknesses less than 10 mils and preferably less than 5 mils, or no more than a net 10 mil thickness of tungsten including both layers. In this manner, the neutron absorption cross-section of tungsten is minimized. The tungsten inner and outer layers, however thin, provide superior properties to the emitter electrode over those which could be provided employing an emitter member formed entirely of a low neutron absorption cross-section, such as niobium. Niobium alone unfortunately has a tendency to react with the nuclear fuel at the operating temperatures given. In addition, the vapor pressure of niobium as an emitter surface is too high for adequate operation and long emitter life. However, the niobium layer 16 as a layer intermediate surfaces 15 and 17 provides the necessary electrical and heat conductivity plus mechanical strength properties to complete the emitter member. The overall wall thickness of emitter member 4 is conveniently about one millimeter.

While tungsten is preferred for inner and outer layers 15 and 17 by virtue of possessing the aforementioned advantages, rhenium as a high temperature refractory material is a next possible choice and has been found especially advantageous as outer emitting layer 17. Thus a rhenium-niobium-rhenium combinatiton is possible. Also binary or trinary alloys of tungsten, rhenium, and molybdenum are desirable materials for layers 15 and 17. An emitter member having a tungsten inner layer adjoining the atomic fuel, a rhenium outer layer, and a niobium layer intermediate the two, appears to possess the advantage of somewhat higher emission density.

Similarly, although niobium is preferred for layer 16, other materials having high refractory properties and comparatively low neutron capture cross-section are suitable for intermediate layer 16, for example, molybdenum, or alloys of niobium and molybdenum. Similarly, the present apparatus need not employ uranium dioxide as nuclear fuel. Uranium dioxide pellets have the advantage of mechanical strength and non-reactivity with tungsten as an inner layer of the emitter member, however, other fuels such as uranium carbide, mixtures of uranium carbide and zirconium carbide or mixtures of one or more of these materials with uranium dioxide are also feasible.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. Electrical power generation apparatus for use in a nuclear reactor including fissionable fuel subjected to a source of neutrons for causing a heat producing sustained fission in said fuel, said apparatus comprising a thermionic converter including a collector and an emitter member in spaced relation therewith, wherein said emitter member is positioned in heat receiving relation to said fuel so that heat generated by fission in said fuel causes copious emission of electrons from said emitter member towards said collector, said emitter member having a first substantially non-reactive refractory metal surface adjoining said fuel, a second refractory metal surface disposed toward said collector, and conductive material intermediate said surfaces which material is of low neutron capture cross-section.

2. Electrical power generation apparatus for use in a nuclear reactor including fissionable fuel subjected to a source of neutrons for causing a heat producing sustained fission in said fuel, said apparatus comprising a thermionic converter including a collector and an emitter member in spaced relation therewith and alkali metal vapor therebetween, wherein said emitter member is positioned in heat receiving relation to said fuel so that heat generated by fission in said fuel causes copious emission of electrons from said emitter member towards said collector, said emitter member having a first substantially non-reactive refractory metal surface adjoining said fuel, a second refractory metal surface disposed toward said collector, and conductive material intermediate said surfaces which material is of low neutron capture cross-section.

3. Electrical power generation apparatus for use in a nuclear reactor including fissionable fuel subjected to neutron bombardment for causing heat producing sustained fission in said fuel, said apparatus comprising a thermionic converter including a collector and an emitter member in spaced relation therewith, wherein said emitter member is positioned in heat receiving relation to said fuel so that heat generated by fission in said fuel causes copious emission of electrons from said emitter member towards said collector, wherein said emitter member is positioned between said fuel and said collector, said emitter member having a first refractory metal surface selected from the group consisting of tungsten, rhenium, molybdenum and alloys thereof adjoining said fuel, a second refractory metal electrode surface disposed towards said collector selected from the group consisting of tungsten, rhenium, molybdenum and alloys thereof, and a material layer intermediate said surfaces selected from the group consisting of niobium and molybdenum.

4. Electrical power generation apparatus for use in a nuclear reactor including fissionable fuel subject to a sustained fission reaction in said fuel, said apparatus comprising a thermionic converter including a collector and an emitter member wherein said emitter member is in heat conductive relation to said fuel so that said emitter member is heated to a point providing a copious emission of electrons, said emitter member having a surface of tungsten for adjoining said fuel, a second electrode surface disposed towards said collector which is also formed of tungsten, and a thickness of niobium intermediate said surfaces.

5. Electrical power generation apparatus for use in a nuclear reactor including a fuel rod containing fissionable fuel subjected to a source of neutrons initiating heat producing fission in said fuel rod, said fuel rod including at least one central body of fissionable fuel, a first thickness of refractory metal containing and enclosing said fuel, a second thickness of low neutron capture cross-section metal enclosing said first metal thickness, a third thickness of refractory material of refractory electrode metal enclosing said second thickness of metal for acting as an emitter of electrons as heated by said fissionable fuel, and an anode metal structure spaced from said third thickness of metal for receiving electrons emitted therefrom.

6. The apparatus according to claim 5 wherein said first thickness of metal is tungsten, said second thickness of metal is niobium and said third thickness is tungsten.

7. The apparatus according to claim 6 wherein said fissionable fuel is uranium dioxide, said collector structure is formed of niobium, and an environment of cesium vapor is provided between collector and emitter.

8. Electrical power generation apparatus for use in a nuclear reactor including a fuel rod containing fissionable fuel subjected to a source of neutrons during initiation of operation of said reactor causing heat producing fission in said fuel rod, said apparatus comprising a series of thermionic converters disposed longitudinally in said rod connected in series and each including an emitter member comprising a cylindrical enclosure coaxial of said rod for containing fissionable fuel, said enclosure having an inner layer of tungsten for contacting said fissionable fuel, an outer layer of tungsten for providing an electron emitting surface, and an intermediate layer of niobium having the property of low neutron capture cross-section, and a cylindrical collector surrounding said emitter member in substantially coaxial spaced relation thereto.

9. The apparatus according to claim 8 wherein said fissionable fuel is selected from the group consisting of uranium dioxide, uranium carbide, mixtures of uranium carbide and zirconium carbide, and other admixtures of the foregoing fuels.

10. Electrical power generation apparatus for use in a nuclear reactor including fissionable fuel subjected to a source of neutrons initiating a sustained fission in said fuel, said apparatus comprising a thermionic converter including a collector and an emitter member wherein said emitter member is in heat conductive relation to said fuel so that said emitter member is heated to a point providing a copious supply of electrons, said emitter member having a surface of tungsten for containing said fuel, a second electrode surface disposed towards said collector which surface is formed of rhenium, and a thickness of niobium intermediate said surfaces.

11. Electrical power generation apparatus for use in a nuclear reactor including fissionable fuel, subjected to a source of neutrons initiating a sustained fission reaction in said fuel and producing a heat in excess of 2000° K., said apparatus comprising a thermionic converter including a collector and an emitter member wherein said emitter member is in heat conductive relation to said fuel so that said emitter member is heated to a point providing a copious supply of electrons, said emitter member having a layer of tungsten less than 10 mils thick contacting said fuel, a second electrode surface layer disposed towards said collector which is formed of a metal selected from the group consisting of tungsten and rhenium being less than 10 mils in thickness, and a thickness of niobium intermediate said surface layers.

References Cited

UNITED STATES PATENTS

| | | | |
|---|---|---|---|
| 2,992,172 | 7/1961 | Blainey | 176—91 X |
| 3,161,786 | 12/1964 | Gunther | 310—4 |
| 3,168,399 | 2/1965 | Takahashi | 176—91 X |
| 3,179,822 | 4/1965 | Block | 310—4 |

MILTON O. HIRSHFIELD, *Primary Examiner.*

J. W. GIBBS, *Assistant Examiner.*